(12) United States Patent
Ando et al.

(10) Patent No.: US 7,975,315 B2
(45) Date of Patent: Jul. 5, 2011

(54) ATOMIC FORCE MICROSCOPE

(75) Inventors: Toshio Ando, Ishikawa (JP); Takayuki Uchihashi, Ishikawa (JP); Noriyuki Kodera, Ishikawa (JP); Naohisa Takahashi, Ishikawa (JP)

(73) Assignee: National University Corporation Kanazawa University, Ishikawa (JP)

( * ) Notice: Subject to any disclaimer, the term of this patent is extended or adjusted under 35 U.S.C. 154(b) by 248 days.

(21) Appl. No.: 12/439,598

(22) PCT Filed: Jul. 27, 2007

(86) PCT No.: PCT/JP2007/064732
§ 371 (c)(1),
(2), (4) Date: May 26, 2009

(87) PCT Pub. No.: WO2008/029562
PCT Pub. Date: Mar. 13, 2008

(65) Prior Publication Data
US 2010/0024082 A1   Jan. 28, 2010

(30) Foreign Application Priority Data
Sep. 4, 2006 (JP) .................. 2006-238886

(51) Int. Cl.
*G01Q 20/02* (2010.01)
*G01Q 60/32* (2010.01)
*G01Q 60/34* (2010.01)

(52) U.S. Cl. ............... 850/6; 850/37; 850/38; 310/317; 310/316.01; 331/35; 331/116 M; 331/156; 331/183

(58) Field of Classification Search .................. None
See application file for complete search history.

(56) References Cited

U.S. PATENT DOCUMENTS

| | | | | |
|---|---|---|---|---|
| 5,966,053 A | * | 10/1999 | Durig et al. | 331/116 M |
| RE36,488 E | * | 1/2000 | Elings et al. | 250/234 |
| 6,189,374 B1 | * | 2/2001 | Adderton et al. | 73/105 |
| 2003/0137216 A1 | | 7/2003 | de Miguel et al. | |
| 2008/0307864 A1 | * | 12/2008 | Uchihashi et al. | 73/105 |

FOREIGN PATENT DOCUMENTS

| | | |
|---|---|---|
| JP | 2003-194699 A | 7/2003 |
| JP | 2003-532060 A | 10/2003 |
| JP | 2004-226237 A | 8/2004 |

OTHER PUBLICATIONS
International Search Report for PCT/JP2007/064732.

* cited by examiner

*Primary Examiner* — Jack I Berman
(74) *Attorney, Agent, or Firm* — Pearne & Gordon LLP

(57) ABSTRACT

There is provided an atomic force microscope (AFM) with increase the speed and sensitivity of detection of the resonant frequency shift in a cantilever. An AFM (1) extracts a reference signal and a phase shift signal from a detection signal from a displacement sensor of the cantilever. The reference signal is restrained from a phase change in accordance with the resonant frequency shift. The phase shift signal has a phase shifted in accordance with the resonant frequency shift. The AFM (1) determines the phase difference of the phase shift signal from the reference signal, as the resonant frequency shift. The AFM (1) may detect the phase difference between a plus-minus inversion point on the reference signal and a corresponding plus-minus inversion point on the phase shift signal. The AFM (1) may adjust phase before phase detection. The phase adjustment may move the detection point for the resonant frequency shift defined on the oscillation waveforms to the plus-minus inversion point. The detection point is set at a position where the cantilever and a sample are closest to each other on the oscillation waveform.

13 Claims, 5 Drawing Sheets

ATOMIC FORCE MICROSCOPE

TECHNICAL FIELD

The present invention relates to an atomic force microscope that self-excitedly oscillates a cantilever at a resonant frequency and observes a sample on the basis of a resonant frequency shift caused by an interaction between the cantilever and the sample.

BACKGROUND ART

Atomic force microscopes (AFM) have been known which use a cantilever to measure the shape of a sample. The AFM is expected as a technique for observing, for example, the nano-level-function of biologic molecules. FM (Frequency Modulation)-AFM, a type of AFM, is known to be able to be used not only in a contact mode but also in a noncontact mode. The FM-AFM is also known to provide high-resolution images.

The FM-AFM generally self-excitedly oscillates a cantilever at a resonant frequency and senses the resonant frequency shift caused by the interaction between the cantilever and a sample to obtain information on the sample. A conventional typical FM-AFM will be described below.

Figure 1:
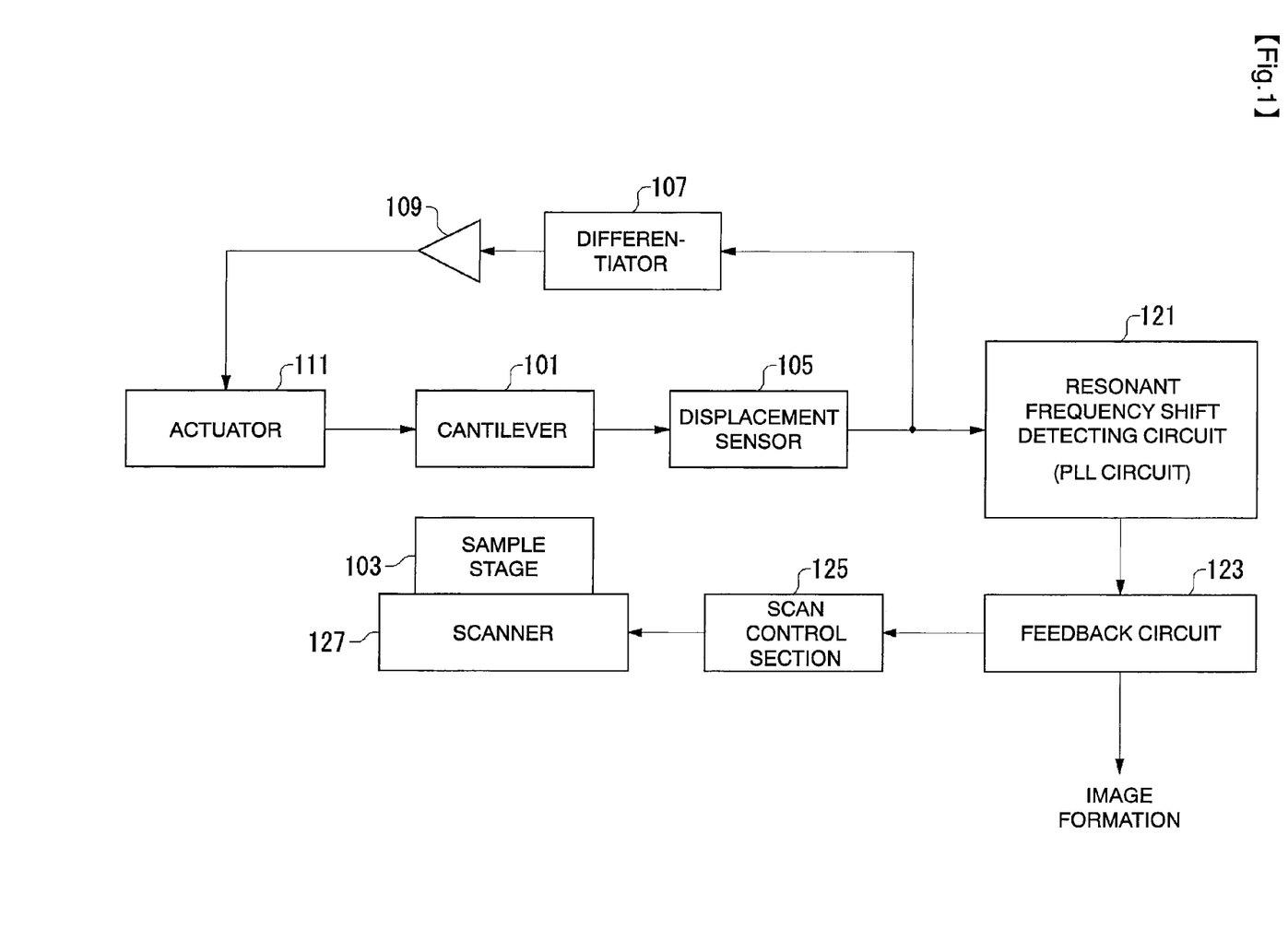
FIG. 1 shows the configuration of a conventional FM-AFM.

FIG. 1 is a block diagram showing the conventional FM-AFM. In FIG. 1, a cantilever 1 has a probe at its leading end. The cantilever 101 is placed so that the probe is in proximity to a sample on a sample stage 103. A displacement sensor 105 is generally based on an optical lever and monitors the displacement of the cantilever 101.

A detection signal from the displacement sensor 105 is differentiated by a differentiator 107. The resultant signal is appropriately gained by an amplifier 109. The resultant driving signal for the cantilever 101 is then supplied to an actuator 111, which then drives the cantilever 101. The actuator 111 is, for example, a piezo element. No other external driving signals are present.

Here, the cantilever 101 is thermally fluctuated. The amplitudes thermally induced around the resonant frequency are larger than those at the other frequencies. This fluctuation appears in the detection signal from the sensor 105 (proportional to the displacement of the cantilever). The detection signal is differentiated and gained, and then supplied as the driving signal. Consequently, the magnitude of the driving signal is increased in the vicinity of the resonant frequency. The cantilever 101 oscillates in the vicinity of the resonant frequency more intensely than before the driving signal is provided. The oscillation is further reflected in the driving signal. This sharply increases the oscillation amplitude in the vicinity of the resonant frequency (increased Q value). The cantilever 101 thus oscillates self-excitedly.

The interaction between the probe of the self-excitedly oscillating cantilever 101 and the sample (they need not necessarily contact) apparently changes the spring constant of the cantilever 101 from the original value owing to the interaction force gradient between the probe and the sample. This shifts (changes) the resonant frequency of the cantilever 101. Thus, detecting the resonant frequency shift enables information on the sample shape to be obtained.

In FIG. 1, the resonant frequency shift is detected by a resonant frequency shift detecting circuit 121 on the basis of a detection signal from the displacement sensor 105. The resonant frequency shift detecting circuit 121 is conventionally usually composed of a phase locked loop (PLL) circuit.

A feedback circuit 123 generates a feedback signal for maintaining a constant resonant frequency shift, on the basis of the resonant frequency shift detected by the resonant frequency shift detecting circuit 121. The feedback signal is supplied to a scan control section 125.

The scan control section 125 controls a scanner 127 so that the sample stage 103 is scanned in an X direction, a Y direction, and a Z direction. The scanner 127 is composed of, for example, a piezo element. In accordance with instructions from a superordinate control section, the scan control section 125 drives the scanner 127 in the X and Y directions. At the same time, the scan control section 125 drives the scanner 127 in the Z direction so as to maintain a constant resonant frequency shift, on the basis of the feedback signal from the feedback circuit 123.

The feedback signal corresponds to the resonant frequency shift. The shift amount of the resonant frequency increases or decreases in accordance with the interaction force between the cantilever 101 and the sample. That is, the shift amount varies depending on the distance between the cantilever 101 and the sample. Therefore, the topographs of the sample can be measured on the basis of the feedback signal.

The FM-AFM is configured to detect the resonant frequency shift caused by the interaction between the self-excitedly oscillating cantilever 101 and the sample as described above. The resonant frequency shift occurs even if the probe and the sample are not in contact with each other. Specifically, the interaction is an attractive force between the probe and the sample, which reduces the resonant frequency. Thus, the FM-AFM is used as a noncontact AFM.

Further, if the probe contacts the sample, the interaction is repulsion which increases the resonant frequency. The resultant resonant frequency shift is detected. This resonant frequency shift is more sensitive to the interaction between the probe and the sample than a variation in amplitude. Utilizing this, the FM-AFM can offer a higher resolution than ordinary AC mode AFMs (tapping mode AFMs) which use amplitude variations.

The conventional FM-AFM is disclosed in, for example, Japanese Patent Laid-Open No. 2004-226237.

The conventional general FM-AFM uses a PLL circuit to detect the resonant frequency shift as described above. The PLL circuit is used in order to sensitively detect slight variations in resonant frequency.

However, the PLL circuit detects the resonant frequency shift on the basis of lever oscillation over a long time corresponding to a plurality of cycles. The PLL circuit thus has too low a detection speed, preventing the FM-AFM from achieving high-speed imaging. For example, observing the functional dynamics of biologic molecules requires observations in a short time. However, it is difficult to meet the higher-speed requirement as far as the PLL circuit is used.

The PLL circuit is also disadvantageous in terms of sensitivity as described below. The magnitude of the interaction between the probe and sample increases and decreases even during one cycle of cantilever oscillation. The interaction weakens when the probe is apart from the sample. However, the PLL circuit detects the average resonant frequency shift over a plurality of cycles of cantilever oscillation. That is, the PLL circuit detects the average resonant frequency shift over a long time including the periods when the interaction is weak. This is a factor reducing the sensitivity of detection of the resonant frequency shift.

DISCLOSURE OF THE INVENTION

The present invention has been made under the above background. An object of the present invention is to provide an atomic force microscope that can quickly detect the resonant frequency shift. An object of the present invention is to provide an atomic force microscope that can sensitively detect the resonant frequency shift.

An aspect of the present invention is an atomic force microscope that causes a cantilever to self-excitedly oscillate at a resonant frequency and obtains information on a sample on the basis of a resonant frequency shift caused by an interaction between the cantilever and the sample, comprising: a displacement sensor for detecting displacement of the cantilever; and a resonant frequency shift detecting section (or a resonant frequency detecting means) for detecting the resonant frequency shift caused by the interaction between the cantilever and the sample on the basis of a detection signal from the displacement sensor, wherein the resonant frequency shift detecting section including: a reference signal extracting section (or a reference signal extracting means) for extracting a reference signal from the detection signal from the displacement sensor, the reference signal having a cycle or period corresponding to oscillation of the cantilever and being restrained from (or restricted in) a phase change in accordance with the resonant frequency shift in the cantilever; a phase shift signal extracting section (or a phase shift signal extracting means) for extracting a phase shift signal from the detection signal from the displacement sensor, the phase shift signal having a cycle or period corresponding to oscillation of the cantilever and having a phase shifted in accordance with the resonant frequency shift in the cantilever; and a phase detecting section (or a phase detecting means) for determining the resonant frequency shift by determining, on the basis of the reference signal and the phase shift signal extracted by the reference signal extracting section and the phase shift signal extracting section, a phase difference of the phase shift signal from the reference signal.

Thus, the present invention detects the resonant frequency shift by determining the phase difference between the reference signal and the phase shift signal which are extracted from the sensor detection signal. This configuration enables the resonant frequency shift to be detected without using a PLL circuit as in the prior art. For example, the resonant frequency shift can be detected in each cycle of cantilever oscillation. Therefore, the resonant frequency shift can be quickly detected.

In the present invention, the reference signal extracting section and the phase shift signal extracting section may be a reference signal extracting band pass filter and a phase shift signal extracting band pass filter which have different characteristics from each other. The phase shift signal extracting band pass filter may have a peak frequency in the vicinity of a resonant frequency of free oscillation of the cantilever. The reference signal extracting band pass filter may have a peak frequency at a position offset or apart from the resonant frequency of free oscillation of the cantilever. The reference signal extracting band pass filter may be set to have a smaller Q value than the phase shift signal extracting band pass filter.

The phase detecting section may detect a phase difference between a plus-minus inversion point on an oscillation waveform of the reference signal and a corresponding plus-minus inversion point on an oscillation waveform of the phase shift signal.

The phase detecting section may have a reference rectangular wave generating section (or a reference rectangular wave generating means) for generating a reference rectangular wave from the reference signal, the reference rectangular wave having a rectangular end positioned at the plus-minus inversion point; and a phase shift rectangular wave generating section (or a phase shift rectangular wave generating means) for generating a phase shift rectangular wave from the phase shift signal, the phase shift rectangular wave having a rectangular end positioned at the plus-minus inversion point. The phase detecting section may detect a phase difference between the reference rectangular wave and the phase shift rectangular wave.

The phase detecting section may further comprise: a difference rectangular wave generating section (or a difference rectangular wave generating means) for determining a difference rectangular wave between the reference rectangular wave and the phase shift rectangular wave; a difference rectangular wave integrating section (or a difference rectangular wave integrating means) for integrating the difference rectangular wave; and an integral value acquiring section (or an integral value acquiring means) for acquiring an integral value after integrating one rectangle of the difference rectangular wave. The phase detecting section may detect the integral value as the phase difference between the reference rectangular wave and the phase shift rectangular wave.

The atomic force microscope according to the present invention may have a trigger signal supply section (or a trigger signal supply means) for supplying a trigger signal for integral value acquisition to the integral value acquiring section, at a trigger position delayed from the rectangular end of the phase shift rectangular wave, on the basis of the phase shift rectangular wave generated by the phase shift rectangular wave generating section.

The atomic force microscope according to the present invention may comprise a phase adjusting section (or a phase adjusting means) for adjusting phases of the reference signal and the phase shift signal extracted by the reference signal extracting section and the phase shift signal extracting section. The phase adjusting section may adjust the phases of the reference signal and the phase shift signal so that a detection point for the resonant frequency shift, which is specified on an oscillation waveform of one cycle of each of the unadjusted reference signal and phase shift signal, moves to the corresponding plus-minus inversion point. The phase detecting section may use the reference signal and the phase shift signal having the phases adjusted by the phase adjusting section to detect a phase difference between the plus-minus inversion point on the reference signal and the corresponding plus-minus inversion point on the phase shift signal.

The detection point may be set, on the basis of increase and decrease in the resonance frequency shift along the oscillation waveform of one cycle of the unadjusted phase shift signal, to be a point where the resonant frequency shift is maximum on the oscillation waveform of one cycle.

The detection point may be set to be a point where the cantilever and the sample approach or contact each other on amplitude waveforms of the unadjusted reference signal and phase shift signal.

The phase adjusting section may adjust the phase of at least one of the reference signal and the phase shift signal so that if the resonant frequency of the cantilever is the free oscillation resonant frequency, the phase of the reference signal matches that of the phase shift signal.

Another aspect of the present invention is a resonant frequency shift detecting device for an atomic force microscope that causes a cantilever to self-excitedly oscillate at a resonant frequency and obtains information on a sample on the basis of a resonant frequency shift caused by an interaction between the cantilever and the sample, the device comprising: a reference signal extracting section for extracting a reference signal from a detection signal of a cantilever displacement, the reference signal having a cycle corresponding to oscillation of the cantilever and being restrained from exhibiting a phase change in accordance with the resonant frequency shift in the cantilever; a phase shift signal extracting section for extracting a phase shift signal from the detection signal, the phase shift signal having a cycle corresponding to oscillation of the cantilever and having a phase shifted in accordance with the resonant frequency shift in the cantilever; and a phase detecting section for determining the resonant frequency shift by determining, on the basis of the reference signal and the phase shift signal extracted by the reference signal extracting section and the phase shift signal extracting section, a phase difference of the phase shift signal from the reference signal.

Another aspect of the present invention is a resonant frequency shift detecting method for an atomic force microscope that causes a cantilever to self-excitedly oscillate at a resonant frequency and obtains information on a sample on the basis of a resonant frequency shift caused by an interaction between the cantilever and the sample, the method comprising: extracting a reference signal from a detection signal of a cantilever displacement, the reference signal having a cycle corresponding to oscillation of the cantilever and being restrained from exhibiting a phase change in accordance with the resonant frequency shift in the cantilever; extracting a phase shift signal from the detection signal, the phase shift signal having a cycle corresponding to oscillation of the cantilever and having a phase shifted in accordance with the resonant frequency shift in the cantilever; and determining the resonant frequency shift by determining, on the basis of the reference signal and the phase shift signal, a phase difference of the phase shift signal from the reference signal.

The present invention can provide an atomic force microscope that can quickly detect the resonant frequency shift. The present invention can also provide an atomic force microscope that can sensitively detect the resonant frequency shift.

As described hereafter, other aspects of the invention exist. Thus, this disclosure of the invention is intended to provide a few aspects of the invention and is not intended to limit the scope of the invention described and claimed herein.

BEST MODE FOR CARRYING OUT THE INVENTION

A detailed explanation of the invention will be hereinafter described. The detailed explanation and the accompanying drawings do not limit the invention. Instead, the scope of the invention is limited by claims attached hereto.

Figure 2:
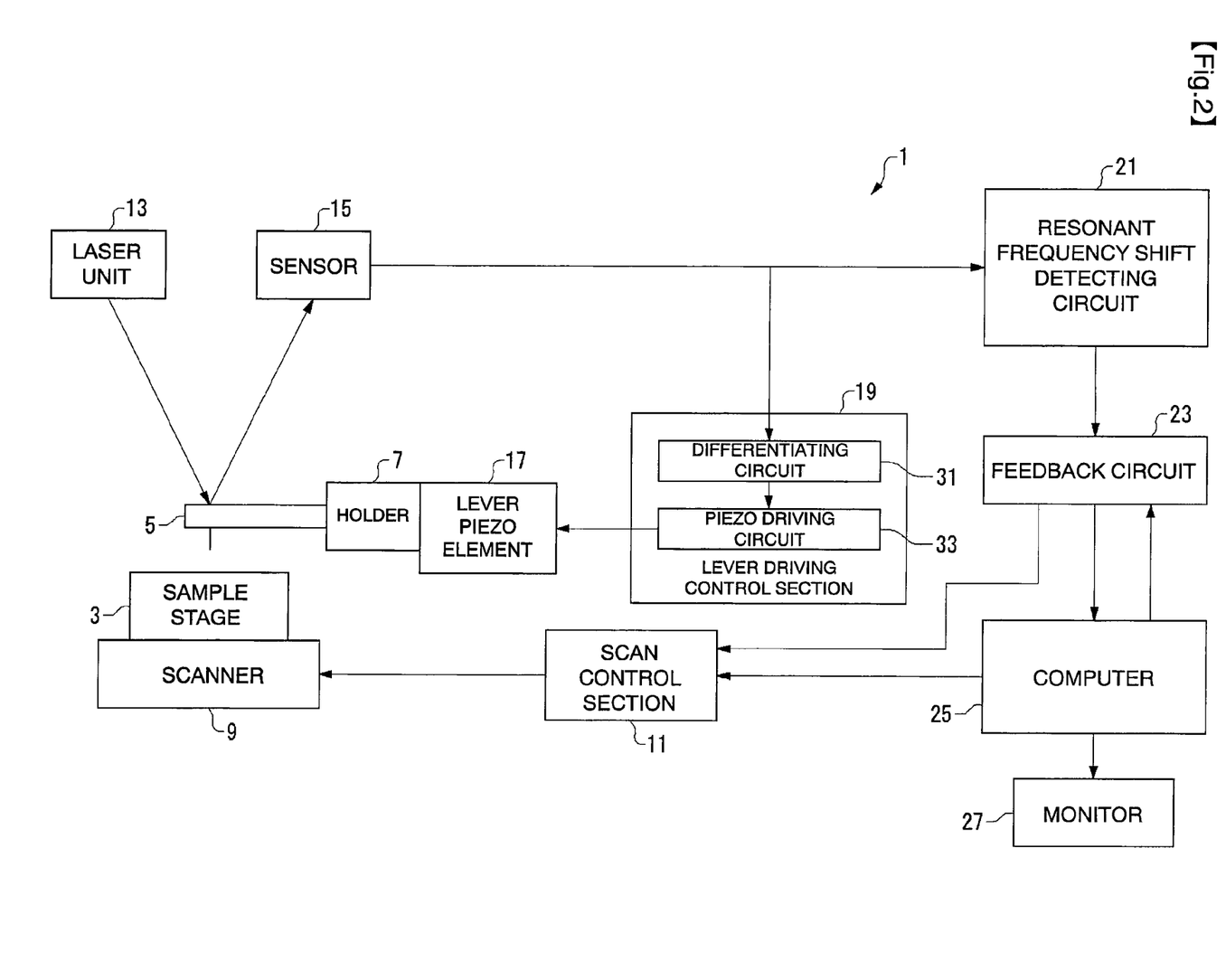
FIG. 2 shows the configuration of an FM-AFM according to an embodiment of the present invention.

FIG. 2 shows the configuration of an atomic force microscope (AFM) according to the present embodiment. First, description will be given of the overall configuration and operation of the AFM 1.

Roughly speaking, first, the AFM 1 comprises a sample stage 3 holding a sample and a cantilever 5 placed in proximity to the sample, as shown in FIG. 2. The cantilever 5 is held by a holder 7. The AFM 1 comprises a scanner 9 and a scan control section 11 as a configuration for performing a scan of the sample stage 3 in an X direction, a Y direction, and a Z direction. The AFM 1 also has a laser unit 13 and a displacement sensor 15 to sense displacement of the cantilever 5. Moreover, a lever piezo element 17 and a lever driving control section 19 are provided to serve as a lever driving section that self-excitedly oscillates the cantilever 5 at a resonant frequency on the basis of a detection signal from the displacement sensor 15.

The AFM 1 also has a resonant frequency shift detecting circuit 21 and a feedback circuit 23. The resonant frequency shift detecting circuit 21 detects the resonant frequency shift caused by the interaction between the cantilever 5 and a sample, on the basis of the detection signal from the displacement sensor 15. The feedback circuit 23 generates a feedback signal in order to control the scanner 7 so that the resonant frequency shift remains constant. The AFM 1 further has a computer 25 that controls the whole device and a monitor 27 that displays observation images supplied by the computer 25.

In the above configuration, the sample stage 3 is attached to the scanner 9. The scanner 9 has piezo elements as actuators to move the sample stage 3 in the X, Y, and Z directions to perform relative scanning of the sample with respect to the cantilever 5. The X and Y directions are orthogonal to each other on a horizontal plane. The Z direction is a vertical direction or the direction of unevenness (i.e. height direction) of the sample. Driving of the scanner 9 is controlled by the scan control section 11.

The cantilever 5 is made of silicon nitride and has a probe at a free end. In the present embodiment, the cantilever 5 is very small in size. Ordinary cantilevers are several hundred µm in length and several tens of µm in width. In contrast, in the present embodiment, the length is at most 10 µm and the width is several µm. By way of example, the length is 7 µm and the width is 2 µm. The present embodiment uses this micro cantilever to improve the sensitivity of detection of the resonant frequency shift. The advantages of the micro cantilever will be described later.

The displacement sensor 15 constitutes an optical lever displacement sensor together with the laser unit 13. The laser unit 13 irradiates the cantilever 5 with laser light. The laser light is reflected by the cantilever 5 and reaches the displacement sensor 15. The displacement sensor 15 is a divided diode sensor composed of a photo diode and outputs signals indicative of displacement of the cantilever 5. The figure doses not show the configuration of an optical system including lenses associated with the sensor.

A lever driving control section 19 is composed of a differentiating circuit 31 and a piezo driving circuit 33. The lever driving control section 19 controls the lever piezo element 17 so that cantilever 5 oscillates self-excitedly at the resonant frequency. A detection signal from the displacement sensor 15 is differentiated by the differentiating circuit 31. The piezo driving circuit 33 has an amplifier to gain differential signals. An output from the piezo driving circuit 33 is supplied to the lever piezo element 17 as a driving signal. The lever piezo element 17 drives the holder 7 to oscillate the cantilever 5 together with the holder 7. This causes the cantilever 5 to self-excitedly oscillate at the resonant frequency.

The resonant frequency shift detecting circuit 21 detects the shift amount of the resonant frequency on the basis of the detection signal from the displacement sensor 15 as described above. The conventional resonant frequency shift detecting circuit is composed of a PLL circuit as already described. In contrast, in the present embodiment, the resonant frequency shift detecting circuit 21 does not use a PLL circuit, and quickly and sensitively detects the resonant frequency shift. The configuration of the resonant frequency shift detecting circuit 21 will be described later in detail.

The resonant frequency shift detected by the resonant frequency shift detecting circuit 21 is output to the feedback circuit 23. Further, the computer 25 inputs a target value for the resonant frequency shift to the feedback circuit 23. The feedback circuit 23 generates a feedback signal corresponding to the difference between the detected value and target value of the resonant frequency shift.

The feedback signal is supplied to the scan control section 11, which utilizes it for feedback scans. The feedback scan involves Z scans performed to keep the resonant frequency shift of the cantilever 5 constant. The feedback signal is also supplied to the computer 25, which uses it to generate sample images.

The computer 25 controls the whole AFM 1. The computer 25 also provides a user interface function. A user inputs various instructions to the computer 25, which thus controls the AFM 1 in accordance with the user's inputs. Further, the computer 25 generates images of the sample surface to output them to the monitor 27.

Now, the overall operation of the AFM 1 will be described. The scan control section 11 is supplied with control signals for scans in the X and Y directions by the computer 25. The scan control section 11 controls driving of the scanner 9 in accordance with the control signals to allow the scanner 9 to perform scans in the X and Y directions.

During scans in the X and Y directions, the displacement sensor 15 detects displacement of the cantilever 5. Then, a detection signal from the displacement sensor 15 is processed by the lever driving control section 19 to generate a driving signal. The driving signal is supplied to the lever piezo element 17 to cause the cantilever 5 to self-excitedly oscillate. The self-excitedly oscillating cantilever 5 and the sample are subjected to relative scanning to each other in the X and Y directions.

The resonant frequency of the self-excitedly oscillating cantilever 5 is shifted by the interaction between the cantilever 5 and the sample. This resonant frequency shift is detected by the resonant frequency shift detecting circuit 21. Then, on the basis of the target value supplied by the computer 25, the feedback circuit 23 generates a feedback signal corresponding to the difference between the detected value and target value of the resonant frequency shift. The feedback signal is supplied to the scan control section 11, which controls driving of the scanner 9 in accordance with the feedback signal so that the detected value of the resonant frequency shift equals its target value. The feedback control maintains a constant distance between the cantilever 5 and the sample.

While thus performing Z scans to maintain the constant distance between the cantilever 5 and the sample, X and Y scans are performed. Feedback signals for the Z scans are supplied to the computer 25 by the feedback circuit 23. The feedback signal corresponds to the height of the sample in the Z direction. Further, a position on the sample in the X and Y directions is determined by X and Y scan control signals generated by the computer 25 and supplied to the scan control section 11. On the basis of the XY scan control data and the input feedback signal, the computer 25 generates and displays an image of the sample surface on the monitor 27. A three-dimensional image is suitably generated and displayed.

Description has been given of overall configuration and operation of the AFM 1 according to the present embodiment. Now, description will be given of the resonant frequency shift detecting circuit 21, which is an arrangement characteristic of the present invention.

Figure 3:
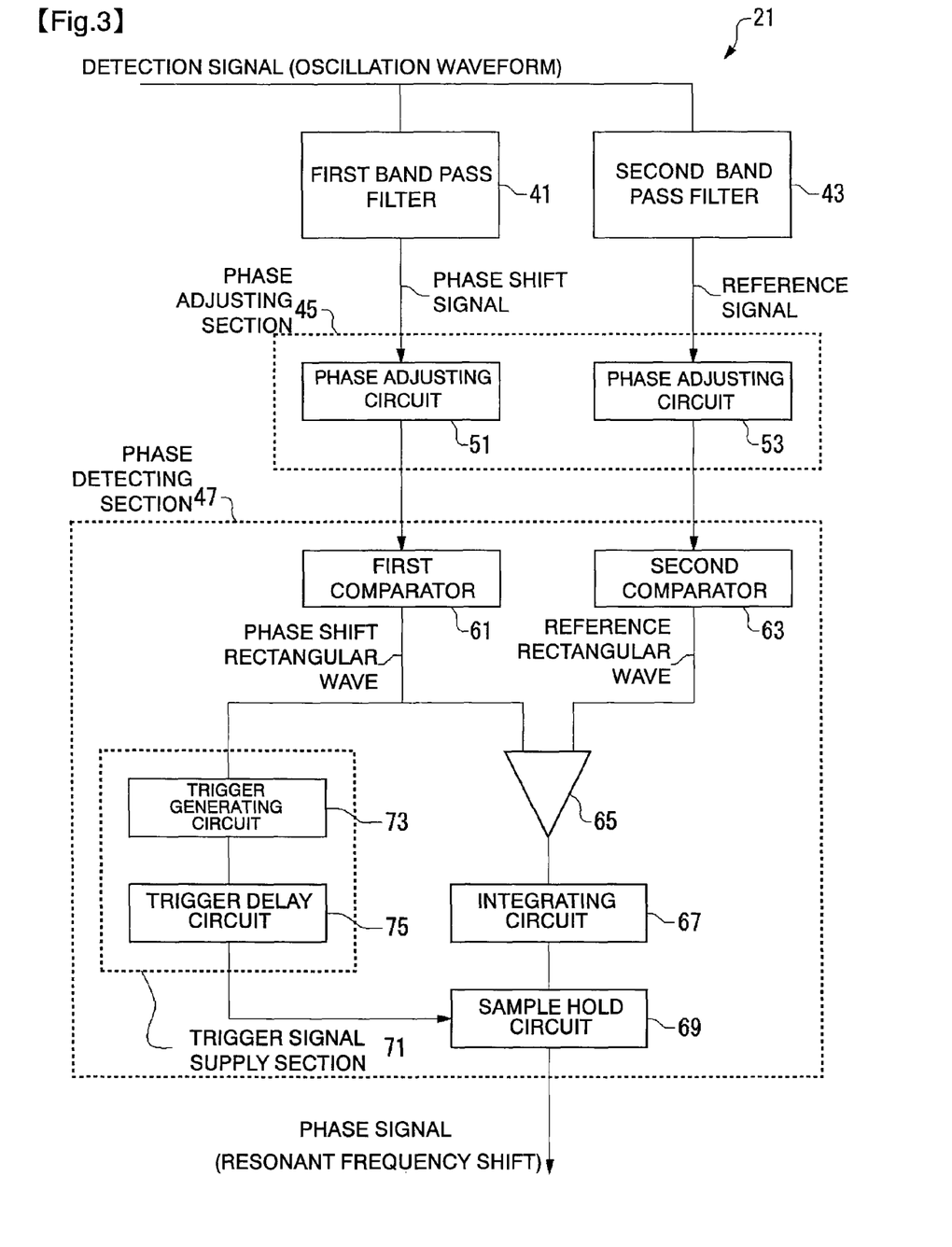
FIG. 3 shows the configuration of a resonant frequency shift detecting circuit.

FIG. 3 shows the configuration of the resonant frequency shift detecting circuit 21. Roughly speaking, the resonant frequency shift detecting circuit 21 includes a first band pass filter 41 (functioning as the phase shift signal extracting section), a second band pass filter 43 (functioning as the reference signal extracting section), a phase adjusting section 45, and a phase detecting section 47. The configuration of each of these components will be described below in detail.

The first band pass filter 41 and the second band pass filter 43 execute filter processes on a detection signal input from the cantilever 5. The characteristics of the first band pass filter 41 and the second band pass filter 43 are differently set as follows.

Figure 4:
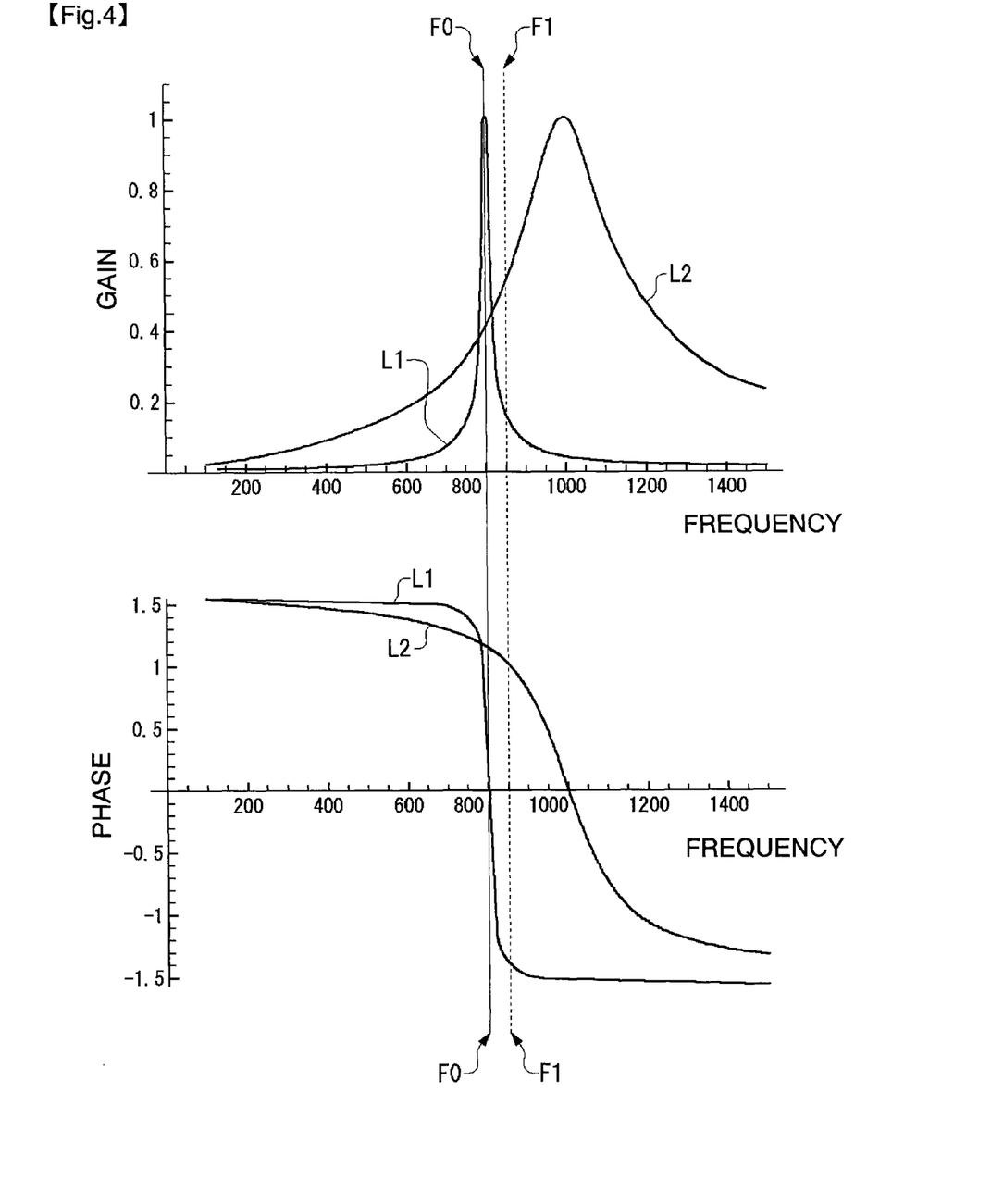
FIG. 4 shows the characteristics of a first band pass filter and a second band pass filter in the resonant frequency shift detecting circuit.

FIG. 4 shows the characteristics of the first band pass filter 41 and second band pass filter 43. Lines L1 indicate the characteristic of the first band pass filter 41. Lines L2 indicate the characteristic of the second band pass filter 43. As shown in the drawing, these filters have different characteristics from each other.

To obtain the characteristics shown in FIG. 4, the peak frequency of the first band pass filter 41 is set in the vicinity of the resonant frequency F0 of free oscillation of the cantilever 5. Further, the first band pass filter 41 is set to have a large Q value. On the other hand, the peak frequency of the second band pass filter 43 is set offset (away) from the resonant frequency F0 of free oscillation of the cantilever 5. In the example of the present embodiment, the peak frequency of the second band pass filter 43 is set much higher than the resonant frequency F0 of free oscillation. Further, the second band pass filter 43 is set to have a smaller Q value than the first band pass filter 41.

With the peak frequency and Q value set as described above, the gain and phase of the first band pass filter 41 change sharply or rapidly in the vicinity of the resonant frequency F0 of free oscillation of the cantilever 5 as shown in FIG. 4. On the other hand, the gain and phase of the second pass filter 43 change insignificantly in the vicinity of the resonant frequency F0 of free oscillation of the cantilever 5 (here, the small Q value ensures a gain of a certain magnitude even at the resonant frequency F0, in spite of deviation of the peak frequency from the resonant frequency F0. This avoids an inappropriate S/N ratio that may result from too small a gain).

Here, in FIG. 4, "F1" denotes the position of the resonant frequency observed when a resonant frequency shift is caused by the interaction between the probe of the cantilever 5 and the sample. In this example, the cantilever 5 and the sample contact and interact with each other to cause repulsion, which increases the resonant frequency.

As seen in FIG. 4, a shift in the resonant frequency considerably delays the phase of a signal having passed through the first band pass filter 41. However, the phase of a signal having passed through the second band pass filter 43 is subjected to almost no change.

As described above, the first band pass filter 41 is configured to extract, from the detection signal from the displacement sensor 15, a signal having a cycle corresponding to oscillation of the cantilever 5 and having a phase shifted depending on (in response to) the resonant frequency shift in the cantilever 5. The first band pass filter 41 corresponds to the phase shift signal extracting section (or the phase shift signal extracting means) and the phase shift signal extracting band pass filter according to the present invention.

On the other hand, the second band pass filter 43 is configured to extract, from the detection signal from the displacement sensor 15, a signal having a cycle corresponding to oscillation of the cantilever 5 and being restrained from exhibiting a phase change depending on the resonant frequency shift in the cantilever 5. The second band pass filter 43 corresponds to the reference signal extracting section (or the reference signal extracting means) and the reference signal extracting band pass filter according to the present invention.

A signal having passed through the first band pass filter 41 is hereinafter referred to as a "phase shift signal". A signal having passed through the second band pass filter 43 is hereinafter referred to as a "reference signal". As described above, the phase shift signal and the reference signal have the same cycle but respond differently to the resonant frequency shift.

Referring back to FIG. 3, the phase adjusting section 45 is configured to adjust the phases of the phase shift signal and the reference signal extracted by the first band pass filter 41 and the second band pass filter 43. The phase adjusting section 45 has two phase adjusting circuits 51 and 53. The phase adjusting circuit 51 is connected to the first band pass filter 41 to adjust the phase of the phase shift signal. The phase adjusting circuit 53 is connected to the second band pass filter 43 to adjust the phase of the reference signal. The phase adjusting circuits 51 and 53 may be composed of phase shifters. The functions of the phase adjusting section 45 will be described later. The phase-adjusted phase shift signal and reference signal are input to the phase detecting section 47.

On the basis of the reference signal and the phase shift signal extracted by the first band pass filter 41 and the second band pass filter 43, the phase detecting section 47 is configured to determine the phase difference of the phase shift signal from the reference signal. As described above, when the resonant frequency shifts, the phase of the phase shift signal shifts, but the phase of the reference signal does not change. Accordingly, the phase difference of the phase shift signal from the reference signal indicates the magnitude of the resonant frequency shift.

Figure 5:
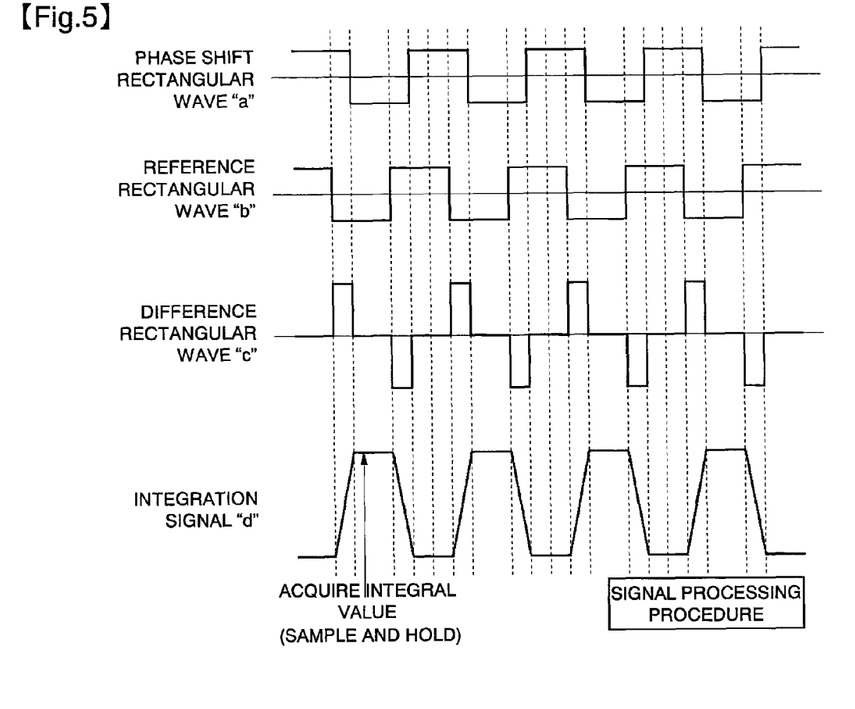
FIG. 5 shows a detecting process executed by a phase detecting section of the resonant frequency shift detecting circuit.

The phase detecting section 47 is composed of a first comparator 61, a second comparator 63, a subtraction circuit 65, an integrating circuit 67, a sample hold circuit 69, and a trigger signal supply section 71 as shown in FIG. 3. Processing executed by the phase detecting section 47 is shown in FIG. 5. With reference to FIG. 5, description will be given of configuration of each part of the phase detecting section 47 in FIG. 3.

The first comparator 61 and the second comparator 63 are zero cross comparators. As shown in FIG. 5, the first comparator 61 and the second comparator 63 generate a phase shift rectangular wave "a" and a reference rectangular wave "b" from the phase shift signal and the reference signal. The plus or minus of the phase shift rectangular wave "a" is switched depending on the plus or minus of oscillation waveform of the phase shift signal. Specifically, in a plus part of the phase shift signal, the phase shift rectangular wave "a" is also plus. In a minus part of the phase shift signal, the phase shift rectangular wave "a" is also minus. Similarly, the plus or minus of the reference rectangular wave "b" is switched depending on the plus or minus of oscillation waveform of the reference signal. The subtraction circuit 65 determines the difference between the phase shift rectangular wave "a" and the reference rectangular wave "b" to output a difference rectangular wave "c" in FIG. 5. The integrating circuit 67 then integrates the difference rectangular wave "c". As shown in the drawing, an integration signal "d" increases or decreases during a rectangular period (i.e. a period in which the phase of the rectangular signal is not zero) of the difference rectangular wave "c" and is flat during the period between rectangles.

Here, the phase of the reference rectangular wave "b" is the same as that of the reference signal. The phase remains almost unchanged even if the resonant frequency shift occurs. On the other hand, the phase of the phase shift rectangular wave "a" is the same as that of the phase shift signal, which varies depending on the resonant frequency shift. A change in the phase of the phase shift rectangular wave "a" increases or reduces the rectangular width of the difference rectangular wave "c", and thereby changes the protrusion and recess amount of the integration signal "d". Accordingly, the voltage of flat part of the integration signal "d" indicates the phase difference of the phase shift rectangular wave "a" from the reference rectangular wave "b", that is, the shift amount of the resonant frequency. Thus, the voltage of flat part of the integration signal "d" is obtained by the sample hold circuit 69 at an appropriate timing. The voltage is output as a phase difference between the rectangular waves, that is, as the detected value of the resonant frequency shift.

The trigger signal supply section 71 is a circuit which supplies the sample hold circuit 69 with a trigger signal for acquiring an integral value. The trigger signal supply section 71 is composed of a trigger generating circuit 73 and a trigger delay circuit 75. The trigger generating circuit 73 generates a trigger signal on the basis of the phase shift rectangular wave "a" in synchronism with a transition of the phase shift rectangular wave "a" from plus to minus. The trigger signal is a pulse signal. The trigger delay circuit 75 slightly delays the trigger signal. The amount of delay is set to be smaller than a width between rectangles of the difference rectangular wave "c". The trigger signal is supplied to the sample hold circuit 69. This ensures that the integral value is held in the flat part of the integral signal.

In the above configuration, the first comparator 61 is configured to generate a phase shift rectangular wave "a" having a rectangular end positioned at a plus-minus inversion point of oscillation waveform of the phase shift signal. The first comparator 61 corresponds to the phase shift rectangular wave generating section (or the phase shift rectangular wave generating means) of the present invention. The second comparator 63 is configured to generate a reference rectangular wave "b" having a rectangular end positioned at a plus-minus inversion point of oscillation waveform of the reference signal. The second comparator 63 corresponds to the reference rectangular wave generating section (or the reference rectangular wave generating means) of the present invention. The subtraction circuit 65 is configured to determine the difference rectangular wave "c" between the reference rectangular wave "b" and the phase shift rectangular wave "a". The subtraction circuit 65 corresponds to the difference rectangular wave generating section (or the difference rectangular wave generating means) of the present invention. The integrating circuit 67 is configured to integrate the difference rectangular wave "c". The integrating circuit 67 corresponds to the difference rectangular wave integrating section (or the difference rectangular wave integrating means) of the present invention. The sample hold circuit 69 is configured to acquire an integral value after one rectangle of the difference rectangular wave "c" has been integrated. The sample hold circuit 69 corresponds to the integral value acquiring section (or the integral value acquiring means) of the present invention. Moreover, the trigger signal supply section 71 is configured to supply a trigger signal at a trigger position delayed from the rectangular end of the phase shift rectangular wave "a". The trigger signal supply section 71 corresponds to the trigger signal supply section (or the trigger signal supply means) of the present invention.

In this configuration, the phase detecting section 47 can detect the resonant frequency shift in the cantilever 5. The phase detecting section 47 can detect the resonant frequency shift at each cycle of cantilever oscillation. Therefore, resonant frequency shift can be detected much more quickly than the use of a conventional PLL circuit.

Now, the functions of the phase adjusting section 45 will be described. The phase adjusting section 45 is configured to execute the following two phase adjustments.

(First Phase Adjusting Function)

With reference to FIG. 4, at the resonant frequency F0 of free oscillation of the cantilever 5, the phase of the reference signal having passed through the second band pass filter 43 is faster than that of the phase shift signal having passed through the first band pass filter 41. Consequently, even when the resonant frequency of the cantilever 5 is the resonant frequency F0 of free oscillation, the flat part of the integration signal d in FIG. 5 is not zero.

In the present embodiment, the phase adjusting section 45 performs phase adjustment so that when the resonant frequency of the cantilever 5 is equal to the free oscillation resonant frequency F0, the phase of the reference signal matches that of the phase shift signal. This phase adjustment adjusts the phase of at least either the reference signal or the phase shift signal. In the present embodiment, the phase adjusting circuit 53 delays the phase of the reference signal.

With this phase adjustment, when the resonant frequency of the cantilever 5 is equal to the resonant frequency F0 of free oscillation, the difference rectangular wave in FIG. 5 and the integration signal are always zero. An output value from the phase detecting section 47 is thus zero. This facilitates a subsequent control process and an image generating process that uses the resonant frequency shift.

(Second Phase Adjusting Function)

As already described, the FM-AFM detects the resonant frequency shift occurring in response to the interaction between the probe and the sample. Strictly speaking, the magnitude of the interaction increases and decreases even during one cycle of the oscillation of the cantilever 5. The interaction is substantially supposed to occur only when the probe is considerably close to the sample.

However, the conventional PLL circuit detects the average resonant frequency shift over one or more cycles, actually a plurality of cycles. Accordingly, the PLL circuit detects the average resonant frequency shift over a long time including the periods when the interaction is weak. This is a factor reducing the sensitivity of detection of the resonant frequency shift.

In particular, if the amplitude of the cantilever is large, there is no interaction almost throughout oscillation; the resonant frequency shifts during only a short time. This makes it difficult for the conventional PLL circuit to detect the resonant frequency shift. Thus, to sensitively detect the field of force of the interaction, the conventional FM-AFM needs to reduce the amplitude of the cantilever. However, the reduced amplitude is disadvantageous in several ways. For example, the reduced amplitude lowers a feedback bandwidth. Further, the snap-in event between the probe and the sample may occur and prevent the probe from being released from the sample. This may make the amplitude zero. The S/N ratio in amplitude measurements may also decrease.

On the other hand, the resonant frequency shift detecting circuit 21 according to the present embodiment relates to increase and decrease in the magnitude of the interaction during the oscillation cycle as follows.

In the present embodiment, at the first comparator 61 and the second comparator 63, the zero cross comparators produce rectangular waves. Zero cross positions of the rectangular waves are determined using the subtraction circuit 65 and integrating circuit 67.

The zero cross positions of the rectangular waves match the zero cross positions (plus-minus inversion points) of the phase shift signal and the reference signal having passed through the first band pass filter 41 and the second band pass filter 43. Accordingly, the configuration of the present embodiment detects the phase difference between the zero cross positions of the phase shift signal and the reference signal.

However, these zero cross positions match the amplitude centers of the oscillation of the cantilever 5 and deviate from the approach point between the probe and sample and thus deviate from the point where the resonant frequency shift is large. This can be a factor reducing the sensitivity of detection of the shift amount of the resonant frequency shift.

Thus, in the present embodiment, the phase adjusting section 45 adjusts phase in order to prevent the decrease in sensitivity.

Figure 6:
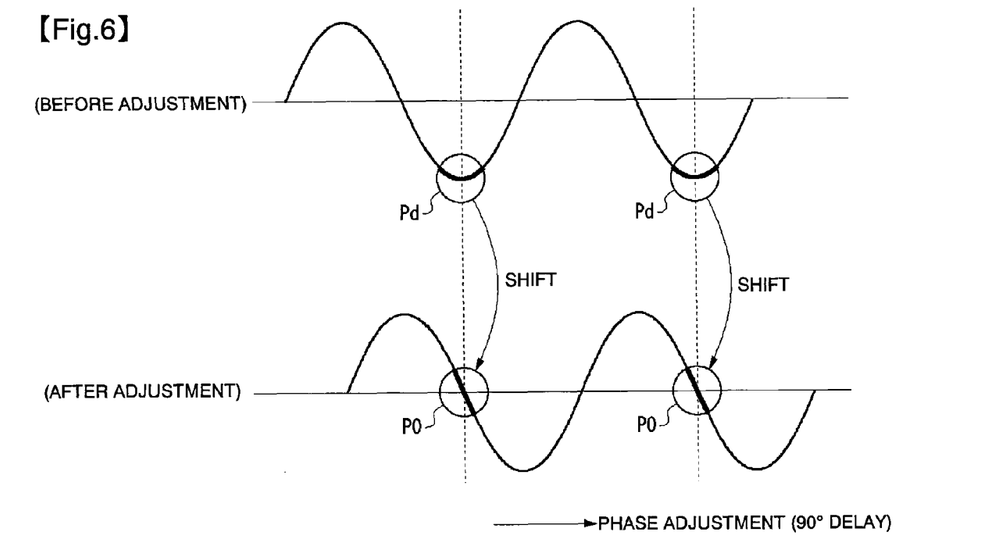
FIG. 6 shows a phase adjusting function executed by the phase detecting section of the resonant frequency shift detecting circuit.

FIG. 6 shows the phase adjustment according to the present embodiment. The upper stage of FIG. 6 shows the oscillation waveform of the unadjusted phase shift signal. The present embodiment sets detection points "Pd" for the resonant frequency shift on the oscillation waveform of each cycle of the unadjusted phase shift signal. The detection point "Pd" is preferably set, on the basis of increase and decrease in the resonance frequency shift along the oscillation waveform of one cycle of the unadjusted phase shift signal, to be a point where the resonant frequency shift is maximum on the oscillation waveform of one cycle.

Specifically, as shown in the drawing, the detection point "Pd" is set to be a point where the cantilever 5 and the sample approach or contact each other on amplitude waveforms of the unadjusted phase shift signal. In the present embodiment, since the cantilever 5 and the sample contact each other, the detection point "Pd" is a contact position. For a noncontact AFM in which the cantilever 5 and the sample do not contact each other, the detection point "Pd" is set at an approach position. In either way, with an increase and decrease in the magnitude of the resonant frequency shift taken into account, the detection point "Pd" is preferably set to be a point where the cantilever 5 and the sample are closest to each other on the oscillation waveform or at the vicinity thereof, such that the detection point Pd is a point where resonant frequency shift becomes maximum.

The lower stage of FIG. 6 shows the phase-adjusted phase shift signal. The phase adjustment is carried out so as to move the detection point "Pd" to a zero cross position "P0" (plus-minus inversion point). Specifically, since the detection point "Pd" is the lowest point (bottom of a valley) of the oscillation waveform, the phase is delayed by a quarter cycle (90 degrees).

Although FIG. 6 shows the phase adjustment of the phase shift signal, the same detection points "Pd" are set for the reference signal and the same phase adjustment is executed on the reference signal.

The phase shift signal and the reference signal are adjusted by the phase adjusting circuits 51 and 53, respectively. The phase-adjusted phase shift signal and reference signal are input to the phase detecting section 47. The phase detecting section 47 uses the phase-adjusted reference signal and phase shift signal to detect the phase difference between a zero cross position of the reference signal and the corresponding zero cross position of the phase shift signal.

Thus, the present embodiment adjusts phase so that each detection point "Pd" shifts to the corresponding zero cross position "P0". This makes it possible to detect the resonant frequency shift at a moment when the magnitude of the interaction between the probe and the sample increases. The detection sensitivity can thus be drastically improved.

With the conventional PLL circuit, if the amplitude of the cantilever is large, the sensitivity of detection of the resonant frequency shift decreases as previously described. The present embodiment enables the resonant frequency shift to be sensitively detected even when the amplitude of the cantilever is large.

Further, with the FM-AFM, the cantilever has a large Q value and thus its amplitude responds slowly (the resonant frequency shift responds quickly regardless of the Q value), whereby the scan speed is determined. Thus, the cantilever oscillates a number of times within a time corresponding to one image pixel. Although movement of a zero cross point resulting from phase adjustment does not instantaneously occur, the movement of the zero cross point is completed within a plurality of cycles of oscillation, therefore, the phase adjustment is sufficiently effective.

The above mentioned first phase adjustment and second phase adjustment are executed together at the same time. In the example of the present embodiment, the first phase adjustment delays the phase only of the reference signal. Moreover, the second phase adjustment delays the phases of the reference signal and the phase shift signal by the same amount. Consequently, the phase of the reference signal is subjected to adjustment corresponding to the sum of adjustment amounts of the first and second phase adjustments. The phase shift signal is subjected only to the second phase adjustment.

Description has been given of configuration of each part of the resonant frequency shift detecting circuit 21. Now, the operation of the resonant frequency shift detecting circuit 21 will be described. A detection signal from the displacement sensor 15 indicates the oscillation waveform of the cantilever 5. The detection signal is passed through the first band pass filter 41 and the second band pass filter 43 to generate a phase shift signal and a reference signal. The phase adjusting section 45 executes the above phase adjustment on the phase shift signal and the reference signal. The phase-adjusted signals are supplied to the phase detecting section 47.

In the phase detecting section 47, the first comparator 61 and the second comparator 63 generate a phase shift rectangular wave and a reference rectangular wave from the phase shift signal and the reference signal. The subtraction circuit 65 generates a deference rectangular wave from the both rectangular waves. The integrating circuit 67 integrates the difference rectangular wave. Then, at the timing of a trigger signal supplied by the trigger signal supply section 71, the sample hold circuit 69 holds the integral value. Then, the held integral value is output by the resonant frequency shift detecting circuit 21 as the phase difference between the reference signal and the phase shift signal, that is, as the value of the resonant frequency shift.

(Micro Cantilever)

Now, description will be given of advantages of the micro cantilever adopted in the present embodiment. As already described, the ordinary cantilever is several hundred μm in length and several tens of μm in width. In contrast, the micro cantilever of the present embodiment is at most 10 μm in length and at most several μm in width, preferably, at most 10 μm in length and at most 2 μm in width, for example, 7 μm in length and 2 μm in width.

The following equation is given by approximating the equation of motion of the cantilever using a mass system.

$$m\ddot{z}+\gamma\dot{z}+kz=f(t)+F(z(t)) \quad (1)$$

Here, f(t) denotes an excitation signal for the cantilever. F(z(t)) denotes a force applied to between the probe and the sample. F(z) is approximated by:

$$F(z) \approx F_0 + k'z$$

The equation of motion is modified as follows.

$$m\ddot{z}+\gamma\dot{z}+(k-k')z=f(t)+F_0 \quad (2)$$

As a result, the shift amount Δfc of the resonant frequency fc is expressed by:

$$\Delta f_c \approx -\frac{1}{2}f_c\frac{k'}{k} \quad (3)$$

As shown in this equation, the shift amount Δfc is proportional to fc/k (ratio of the resonant frequency fc to a spring constant "k"). The ratio fc/k is significantly high for the micro cantilever than for the ordinary cantilever; the ratio fc/k of the micro cantilever is at least about 1,000 times as high as that of the ordinary cantilever. Consequently, the use of the micro cantilever results in the larger resonant frequency shift, which further increases the detection sensitivity. Further, the resonant frequency can be suitably detected without using any slower detection circuit such as the conventional PLL circuit.

However, the cantilever need not be very small in size according in the scope of the present invention. The value of fc/k required for the cantilever will be discussed below.

Here, the frequency shift detection sensitivity (frequency shift amount equivalent to a noise level) is assumed to be 29 Hz (this sensitivity is based on measurements obtained when the phase adjustment in FIG. 6 is not executed. The phase adjustment further increases the sensitivity). Further, the gradient coefficient "k" of field of force applied between the probe and the sample is assumed to be 0.00088 N/m (this value is also based on measurements. k' actually depends on the sample and probe. In this case, the above values are used for the discussion).

Substituting these values in Δfc=(−½)×fx/k'/k mentioned above results in fc/k=66,000[m/(s·N)].

The value of fc/k increases with decreasing size of the cantilever. Thus, on the basis of the above calculation, the size of the cantilever may be set so that fc/k is at least 66,000 [m/(s·N)]. Reducing the noise in the resonant frequency shift detecting circuit or the above phase adjustment further increases the sensitivity. In this case, the resonant frequency shift can be detected even with a smaller fc/k value, that is, a larger cantilever. Then, commercially available cantilevers of ordinary sizes are expected to be able to detect the resonant frequency shift.

However, as already described, the use of the micro cantilever increases the fc/k value and the magnitude of the resonant frequency shift. This enables the sensitivity to be improved. Thus, taking account of the lower limit value of fc/k (66,000 [m/(s·N)]) mentioned above, the fc/k of the micro cantilever is preferably at least 10 times as large as the lower limit value. That is, fc/k of the micro cantilever is at least 660,000 [m/(s·N)].

In the example of the present embodiment, the cantilever is 7 μm in length and 2 μm in width as previously described. In this case, fc/k is 6,000,000. This value is 91 times as large as the lower limit value. Therefore, the micro cantilever of the present embodiment enables sensitive detections.

The advantages of the micro cantilever have been described. Finally, variations of the present embodiment will be described.

In the present embodiment, the actuator of the cantilever 5 is the piezo element. However, the present invention is not limited to this. For example, the actuator may utilize magnetic fields (in this case, a magnetic coat is applied to the cantilever). Further, for example, the actuator may emit laser light (in this case, the cantilever is driven utilizing thermal expansion caused by light irradiation).

In the present embodiment, the differentiating circuit 31 is provided to cause the cantilever 5 to self-excitedly oscillate. In a variation, a phase shifter is provided. Phase adjustment by the phase shifter can also cause the cantilever 5 to oscillate self-excitedly.

In the present embodiment, the band pass filter extracts the phase shift signal and the reference signal from the detection signal from the sensor (specifically, the first band pass filter 41 and second band pass filter 43 in FIG. 4). The band pass filter is suitable as an arrangement for converting the resonant frequency shift into a phase shift. However, the phase shift signal and the reference signal can be generated by any arrangement other than the band pass filters provided that the arrangement can convert the resonant frequency shift into the phase shift. For example, low pass filters may be used. That is, the phase shift signal extracting section (or the reference signal extracting means) and the reference signal extracting section (or the reference signal extracting means) are not limited to band pass filters.

In the present embodiment, the phase shift rectangular wave and the reference rectangular wave have their plus and minus reversed at a rectangular end. More specifically, the original phase shift signal and reference signal are sine waves. While the sine wave is plus, the rectangular wave is also plus. While the sine wave is minus, the rectangular wave is also minus. However, the rectangular wave is not limited to this. For example, rectangular waves only having plus values may be used. In this case, the first comparator 61 and the second comparator 63 in FIG. 3 provide a plus rectangular signal in the plus part of the original sine wave and a zero signal in the minus part of the sine wave. Alternatively, for example, rectangular waves having only minus values may be used. Provided that the rectangular end of the rectangular wave is positioned at the plus-minus inversion point on the original signal, the above resonant frequency shift detecting process can be executed in the scope of the present invention.

In the present embodiment, the trigger signal supply section 71 supplies the trigger signal to the sample hold circuit 69 at a timing slightly delayed from the rectangular end of the phase shift rectangular wave. In the above embodiment, a trigger signal is first generated at the rectangular end of the phase shift rectangular wave and then delayed. However, in a variation, the phase shift rectangular wave may be subjected to a delay process before a trigger signal is generated at the rectangular end.

Description has been given of the AFM according to the embodiment of the present invention. According to the present invention, the reference signal and the phase shift signal are extracted from the detection signal from the displacement sensor. The reference signal is a signal having a cycle or period corresponding to oscillation of the cantilever and being restrained from (or restricted in) exhibiting a phase change depending on the resonant frequency shift in the cantilever. The phase shift signal is a signal having a cycle or period corresponding to oscillation of the cantilever and having a phase shifted depending on the resonant frequency shift in the cantilever. On the basis of the reference signal and the phase shift signal, by determining the phase difference of the phase shift signal from the reference signal, the resonant frequency shift is determined.

Thus, the present invention determines the phase difference between the reference signal and the phase shift signal extracted from the sensor detection signal to detect the resonant frequency shift. This configuration enables the resonant frequency shift to be detected without using a PLL circuit as in the prior art. In the above example, one detection is possible in one cycle of cantilever oscillation. Thus, the resonant frequency shift can be quickly detected.

Further, according to the present invention, the phase shift signal extracting band pass filter and the reference signal extracting band pass filter may generate the phase shift signal and the reference signal. The phase shift signal extracting band pass filter and the reference signal extracting band pass filter correspond to the first band pass filter 41 and the second band pass filter 43 in FIG. 3. These band pass filters have different characteristics from each other. As shown in FIG. 4, the phase shift signal extracting band pass filter has a peak frequency in the vicinity of the resonant frequency of free oscillation of the cantilever. The reference signal extracting band pass filter has a peak frequency at a position offset or apart from the resonant frequency of free oscillation of the cantilever. The reference signal extracting band pass filter has a Q value set smaller than that of the phase shift signal extracting band pass filter. As described above with reference to FIG. 4, these two filter characteristics enable the appropriate generation of the reference signal limited in the response to the resonant frequency shift and the phase shift signal sensitively responding to the resonant frequency shift. This also improves the sensitivity of detection of the resonant frequency shift.

Further, the AFM of the present invention may detect the phase difference between the plus-minus inversion point on the oscillation waveform of the reference signal and the corresponding plus-minus inversion point on the oscillation waveform of the phase shift signal. The plus-minus inversion point corresponds to the above mentioned zero cross position. The plus-minus inversion points on the reference signal and the phase shift signal can be accurately determined. Therefore, the resonant frequency shift, which corresponds to the phase difference between these plus-minus inversion points, can be accurately determined.

Furthermore, according to the present invention, a reference rectangular wave and a phase shift rectangular wave may be generated from the reference signal and the phase shift signal as described above. The reference rectangular wave is a rectangular wave having its rectangular end positioned at the plus-minus inversion point on the corresponding reference signal. The phase shift rectangular wave is a rectangular wave having its rectangular end positioned at the plus-minus inversion point on the corresponding phase shift signal. Then, the phase difference between the reference rectangular wave and the phase shift rectangular wave is detected. By using these rectangular waves, plus-minus inversion points on the reference signal and the phase shift signal can be accurately determined, and the resonant frequency shift can be accurately detected.

Moreover, according to the present invention, the difference rectangular wave between the reference rectangular wave and the phase shift rectangular wave may be determined, the difference rectangular wave may be integrated, and an integral value after integrating one rectangle of the difference rectangular wave may be acquired. The integral value corresponds to the phase difference between the reference rectangular wave and the phase shift rectangular wave.

With the above subtracting process, integrating process, and integral value acquiring process, the phase difference between the reference rectangular wave and the phase shift rectangular wave can be accurately determined, and the resonant frequency shift can be accurately detected.

Further, according to the present invention, on the basis of the phase shift rectangular wave, the trigger signal for acquiring an integral value may be supplied at the trigger position delayed from the rectangular end of the phase shift rectangular wave. The timing for the trigger signal corresponds to the flat part of the integration signal in FIG. 5; at this timing, the integration signal is ensured to reach the value corresponding to the magnitude of the resonant frequency shift. By using this trigger signal, the integral value of the difference rectangular wave can be acquired at an appropriate timing. Consequently, the resonant frequency shift can be accurately detected.

Furthermore, according to the present invention, the phases of the reference signal and the phase shift signal are adjusted. In the above example, the phase adjustment is executed by the phase adjusting section 45 in FIG. 3 after the reference signal and the phase shift signal have been extracted. The phase adjustment involves adjusting the phases of the reference signal and the phase shift signal so as to move resonant frequency shift detection points, which are defined on oscillation waveforms of one cycle of the unadjusted reference signal and phase shift signal, to the respective plus-minus inversion points. This phase adjustment corresponds to the above mentioned "second phase adjusting function". The subsequent phase detection involves using the phase-adjusted reference signal and phase shift signal to detect the phase difference between the plus-minus inversion point on the reference signal and the corresponding plus-minus inversion point on the phase shift signal.

Thus, the present invention executes the phase adjustment such that the detection points which are set on the oscillation waveforms move to the respective plus-minus inversion points and then detects the phase with respect to the plus-minus inversion points after adjustment. Consequently, the resonant frequency shift can be detected at the moment when the magnitude of the interaction between the probe and the sample becomes large. This significantly improves the detection sensitivity.

In regards to this, the conventional PLL circuit detects the average resonant frequency shift over one or more cycles even though the magnitude of the resonant frequency shift increases and decreases during one cycle. With such averaging, the sensitivity is limited. On the contrary, in the present invention, the instantaneous resonant frequency shift at the detection point can be detected, allowing the detection sensitivity to be improved.

Moreover, since the conventional PLL circuit detects the average resonant frequency shift, the detection sensitivity decreases when the amplitude of the cantilever is large. This is because, when the amplitude is large, the resonant frequency shift occurs only for a very short time on the waveform. On the contrary, in the present invention, the instantaneous resonant frequency shift can be detected. Therefore, even if the amplitude of the cantilever is large, the resonant frequency shift can be sensitively detected.

According to the present invention, on the basis of increase and decrease in the resonance frequency shift along the oscillation waveform of one cycle of the unadjusted phase shift signal, the detection point may be set to be a point where the resonant frequency shift is maximized on the oscillation waveform of one cycle. With this setting of the detection point, detection can be executed when the magnitude of the resonant frequency shift becomes large, and the detection sensitivity can be improved.

According to the present invention, the detection point may be set to be a point where the cantilever and the sample approach or contact each other on amplitude waveforms of the unadjusted reference signal and phase shift signal. For the contact type AFM, the detection point is set at a contact point. For the noncontact type AFM, the detection point is set at an approach point. In either case, the detection point is preferably set at a point where the probe and the sample are closest to each other on the oscillation waveform. With this point setting, detection can be executed when the magnitude of the resonant frequency shift becomes large, and the detection sensitivity can be improved.

The present invention may provide another phase adjusting function. This phase adjusting function corresponds to the above mentioned "first phase adjusting function", and adjusts the phase of at least one of the reference signal and the phase shift signal so that when the resonant frequency of the cantilever is equal to the free oscillation resonant frequency, the phase of the reference signal matches that of the phase shift signal. With this phase adjustment, the detected value of the resonant frequency shift becomes zero when the resonant frequency of the cantilever is equal to the free oscillation resonant frequency. This facilitates the subsequent control process and/or an image generating process that uses the resonant frequency shift.

While the preferable embodiments of the present invention which are possible at present have been explained, it should be understood that a number of modifications to the present embodiments can be made, and it is intended that such modifications within the true spirit and scope of the present invention are also included in the scope of the appended claim.

INDUSTRIAL APPLICABILITY

As described above, the atomic force microscope according to the present invention can quickly and sensitively detect the resonant frequency shift. The atomic force microscope according to the present invention is thus useful as a technique for enabling observation of biologic molecules or the like.

The invention claimed is:

1. An atomic force microscope that causes a cantilever to self-excitedly oscillate at a resonant frequency and obtains information on a sample on the basis of a resonant frequency shift caused by an interaction between the cantilever and the sample, comprising:
   a displacement sensor for detecting displacement of the cantilever; and
   a resonant frequency shift detecting section for detecting the resonant frequency shift caused by the interaction between the cantilever and the sample on the basis of a detection signal from the displacement sensor, wherein
   the resonant frequency shift detecting section including:
   a reference signal extracting section for extracting a reference signal from the detection signal from the displacement sensor, the reference signal having a cycle corresponding to oscillation of the cantilever and being restrained from a phase change in accordance with the resonant frequency shift in the cantilever;
   a phase shift signal extracting section for extracting a phase shift signal from the detection signal from the displacement sensor, the phase shift signal having a cycle corresponding to oscillation of the cantilever and having a phase shifted in accordance with the resonant frequency shift in the cantilever; and a phase detecting section for determining the resonant frequency shift by determining, on the basis of the reference signal and the phase shift signal extracted by the reference signal extracting section and the phase shift signal extracting section, a phase difference of the phase shift signal from the reference signal.

2. The atomic force microscope according to claim 1, wherein the reference signal extracting section and the phase shift signal extracting section are a reference signal extracting bandpass filter and a phase shift signal extracting band pass filter which have different characteristics from each other, the phase shift signal extracting band pass filter has a peak frequency in the vicinity of a resonant frequency of free oscillation of the cantilever and the reference signal extracting band pass filter has a peak frequency at a position offset from the resonant frequency of free oscillation of the cantilever, and the reference signal extracting band pass filter is set to have a smaller Q value than the phase shift signal extracting band pass filter.

3. The atomic force microscope according to claim 1, wherein the phase detecting section detects a phase difference between a plus-minus inversion point on an oscillation waveform of the reference signal and a plus-minus inversion point on an oscillation waveform of the phase shift signal.

4. The atomic force microscope according to claim 3, wherein the phase detecting section has:
 a reference rectangular wave generating section for generating a reference rectangular wave from the reference signal, the reference rectangular wave having a rectangular end positioned at the plus-minus inversion point; and
 a phase shift rectangular wave generating section for generating a phase shift rectangular wave from the phase shift signal, the phase shift rectangular wave having a rectangular end positioned at the plus-minus inversion point, and
 the phase detecting section detects a phase difference between the reference rectangular wave and the phase shift rectangular wave.

5. The atomic force microscope according to claim 4, wherein the phase detecting section further comprises:
 a difference rectangular wave generating section for determining a difference rectangular wave between the reference rectangular wave and the phase shift rectangular wave;
 a difference rectangular wave integrating section for integrating the difference rectangular wave; and
 an integral value acquiring section for acquiring an integral value after integrating one rectangle of the difference rectangular wave, wherein
 the phase detecting section detects the integral value as the phase difference between the reference rectangular wave and the phase shift rectangular wave.

6. The atomic force microscope according to claim 5, comprising a trigger signal supply section for supplying a trigger signal for integral value acquisition to the integral value acquiring section, at a trigger position delayed from the rectangular end of the phase shift rectangular wave, on the basis of the phase shift rectangular wave generated by the phase shift rectangular wave generating section.

7. The atomic force microscope according to claim 3, comprising:
 a phase adjusting section for adjusting phases of the reference signal and the phase shift signal extracted by the reference signal extracting section and the phase shift signal extracting section, wherein the phase adjusting section adjusts the phases of the reference signal and the phase shift signal so that a detection point for the resonant frequency shift, which is specified on an oscillation waveform of one cycle of each of the unadjusted reference signal and phase shift signal, moves to the plus-minus inversion point, and
 the phase detecting section uses the reference signal and the phase shift signal having the phases adjusted by the phase adjusting section to detect a phase difference between the plus-minus inversion point on the reference signal and the plus-minus inversion point on the phase shift signal.

8. The atomic force microscope according to claim 7, wherein, on the basis of increase and decrease in the resonance frequency shift along the oscillation waveform of one cycle of the unadjusted phase shift signal, the detection point is set to be a point where the resonant frequency shift is maximum on the oscillation waveform of one cycle.

9. The atomic force microscope according to claim 7, wherein the detection point is set to be a point where the cantilever and the sample approach or contact each other on amplitude waveforms of the unadjusted reference signal and phase shift signal.

10. The atomic force microscope according to claim 7, wherein the phase adjusting section further adjusts the phase of at least one of the reference signal and the phase shift signal so that when the resonant frequency of the cantilever is the free oscillation resonant frequency, the phase of the reference signal matches that of the phase shift signal.

11. The atomic force microscope according to claim 1, further comprising:
 a phase adjusting section for adjusting the phase of at least one of the reference signal and the phase shift signal extracted by the reference signal extracting section and the phase shift signal extracting section, wherein
 the phase adjusting section carries out phase adjustment such that when the resonant frequency of the cantilever is the free oscillation resonant frequency, the phase of the reference signal matches that of the phase shift signal.

12. A resonant frequency shift detecting device for an atomic force microscope that causes a cantilever to self-excitedly oscillate at a resonant frequency and obtains information on a sample on the basis of a resonant frequency shift caused by an interaction between the cantilever and the sample, comprising:
 a reference signal extracting section for extracting a reference signal from a detection signal of a cantilever displacement, the reference signal having a cycle corresponding to oscillation of the cantilever and being restrained from a phase change in accordance with the resonant frequency shift in the cantilever;
 a phase shift signal extracting section for extracting a phase shift signal from the detection signal, the phase shift signal having a cycle corresponding to oscillation of the cantilever and having a phase shifted in accordance with the resonant frequency shift in the cantilever; and
 a phase detecting section for determining the resonant frequency shift by determining, on the basis of the reference signal and the phase shift signal extracted by the reference signal extracting section and the phase shift signal extracting section, a phase difference of the phase shift signal from the reference signal.

13. A resonant frequency shift detecting method for an atomic force microscope that causes a cantilever to self-excitedly oscillate at a resonant frequency and obtains information on a sample on the basis of a resonant frequency shift caused by an interaction between the cantilever and the sample, comprising:

extracting a reference signal from a detection signal of a cantilever displacement, the reference signal having a cycle corresponding to oscillation of the cantilever and being restrained from a phase change in accordance with the resonant frequency shift in the cantilever;

extracting a phase shift signal from the detection signal, the phase shift signal having a cycle corresponding to oscillation of the cantilever and having a phase shifted in accordance with the resonant frequency shift in the cantilever; and determining the resonant frequency shift by determining, on the basis of the reference signal and the phase shift signal, a phase difference of the phase shift signal from the reference signal.

* * * * *